(12) United States Patent
Jannoun

(10) Patent No.: US 7,070,047 B2
(45) Date of Patent: Jul. 4, 2006

(54) COLORING KIT

(76) Inventor: Janet Jannoun, 5523 Rawis Rd., Tampa, FL (US) 33625

( * ) Notice: Subject to any disclaimer, the term of this patent is extended or adjusted under 35 U.S.C. 154(b) by 254 days.

(21) Appl. No.: 10/408,862

(22) Filed: Apr. 7, 2003

(65) Prior Publication Data
US 2004/0195121 A1    Oct. 7, 2004

(51) Int. Cl.
*B65D 69/00* (2006.01)
(52) U.S. Cl. ...................... 206/232; 206/575
(58) Field of Classification Search ................ 206/223, 206/232, 575, 574, 224, 472, 473; 401/131, 401/194, 195; 434/84
See application file for complete search history.

(56) References Cited

U.S. PATENT DOCUMENTS

| | | | | |
|---|---|---|---|---|
| 518,034 A * | 4/1894 | Hoyle | ................ | 294/138 |
| 665,256 A * | 1/1901 | McComb | ............. | 294/138 |
| 1,136,598 A * | 4/1915 | Gould | .................. | 294/138 |
| 1,809,943 A * | 6/1931 | Ockenden | ............ | 116/239 |
| 2,641,809 A * | 6/1953 | Kimball | .............. | 211/69.8 |
| 2,881,556 A * | 4/1959 | Rosa | .................... | 281/44 |
| 3,176,951 A * | 4/1965 | McFadyen et al. | ...... | 248/227.2 |
| 4,958,759 A * | 9/1990 | Jarvis | ................... | 224/153 |
| 5,050,830 A * | 9/1991 | Hall | ................... | 248/205.2 |
| 5,095,846 A * | 3/1992 | Knight | ................ | 116/238 |
| 5,366,070 A * | 11/1994 | Wolov | ................. | 206/214 |
| 5,456,497 A * | 10/1995 | Ross, Jr. | ............... | 281/42 |
| 6,450,718 B1 * | 9/2002 | Spruill | ................. | 401/131 |

* cited by examiner

*Primary Examiner*—Shian T. Luong
(74) *Attorney, Agent, or Firm*—Arthur W. Fisher, III

(57) ABSTRACT

A coloring kit for storing and carrying a coloring book and a plurality of crayons or coloring implements comprising a carrying bag including an elastic band and a pair of interior pockets to receive and retain the coloring book in the carrying bag and a coloring implement attachment assembly including a plurality of attachment elements detachably attached to the carrying bag to couple a corresponding plurality of crayons or coloring implements to the carrying bag.

22 Claims, 4 Drawing Sheets

COLORING KIT

BACKGROUND OF THE INVENTION

1. Field of the Invention

A coloring kit to store and carry a coloring book and a plurality of coloring implements.

2. Description of the Prior Art

Crayons and coloring books are a perennial favorite source of amusement and entertainment for children. Unfortunately as crayons are removed from the crayon box, the crayons are often lost dropped or misplaced. Various devices have been designed specifically to overcome these problems. In some instances each crayon is attached or coupled to a coloring book.

In addition, portable coloring and drawing boards have been configured to receive and hold a pad of paper and a plurality of crayons attached to the board.

U.S. Pat. No. 1,492,677 relates to a carrier comprising a pair of leaves connected together in swinging relation, strips on the inside of the leaves and adapted to receive the front and back covers of a book and hold them against the inner faces of said leaves, one of the strips being secured at one end to one end of its leaf and being attachable at various spaced intervals from the other end of the leaf, and a flap on the free end of one leaf and adapted to extend over the outside of the other leaf and having means for attaching it to the other leaf to permit holding the leaves at various partly open positions.

U.S. Pat. No. 4,036,417 discloses a cover and carrying arrangement for a book including folded pocket panels as well as elongate handles.

U.S. Pat. No. 4,875,707 shows a book-like receptacle having a plurality of clear cylinders for holding crayons on opposing book surfaces. Opposing cylinders are aligned in registry to lock the book in the closed position. A sleeve in the rear cover of the book enables the user to secure a coloring book to the receptacle.

U.S. Pat. No. 4,958,759 teaches a combined book cover and book carrier including straps that are movably mounted to accommodate books of varying size and handles that include extension straps so the cover and carrier can be carried in the user's hand, on his wrist, over his shoulder or on his back.

U.S. Pat. No. 5,360,342 shows a coloring or drawing board for use by children comprising a central planar surface upon which may be placed and held a coloring book or a paper pad and having a plurality of receptacles along the upper edge for receiving a plurality of crayons. Each of the crayons is tethered to the board permitting use for drawing and coloring on the board, but precluding improper use elsewhere such as on walls of a building.

Additional examples of the prior art are found in U.S. Pat. No. 518,034; U.S. Pat. No. 665,256; U.S. Pat. No. 1,136, 598; U.S. Pat. No. 1,571,173 and CH 195,672.

SUMMARY OF THE INVENTION

The present invention relates to a coloring kit comprising a carrying bag and a coloring implement attachment assembly.

The carrying bag comprises a foldable panel having a flexible carrying handle secured to each end portion with which to carry the coloring kit when in a folded or closed position. The carrying bag further includes a coloring book retainer to selectively retain a coloring book within the interior thereof and at least one coloring implement assembly storage compartment to store the coloring implement attachment assembly when not in use.

The coloring implement attachment assembly comprises a plurality of attachment elements to couple a corresponding plurality of crayons or coloring implements to the carrying bag.

Before use, crayons or coloring implements are coupled to the plurality of attachment elements and the coloring book is held in place in the interior of the carrying bag by the coloring book retainer.

When not in use, the coloring implement attachment assembly and crayons or coloring implements can be stored or placed in the coloring implement assembly storage compartment.

To use, the coloring implement attachment assembly and crayons and coloring implements are removed from the coloring implement assembly storage compartment and attached to the carrying bag. This allows the use of the crayons or coloring implements without rolling or falling away from the coloring book and the carrying bag.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DESCRIPTION OF THE PREFERRED EMBODIMENT

Figure 1:
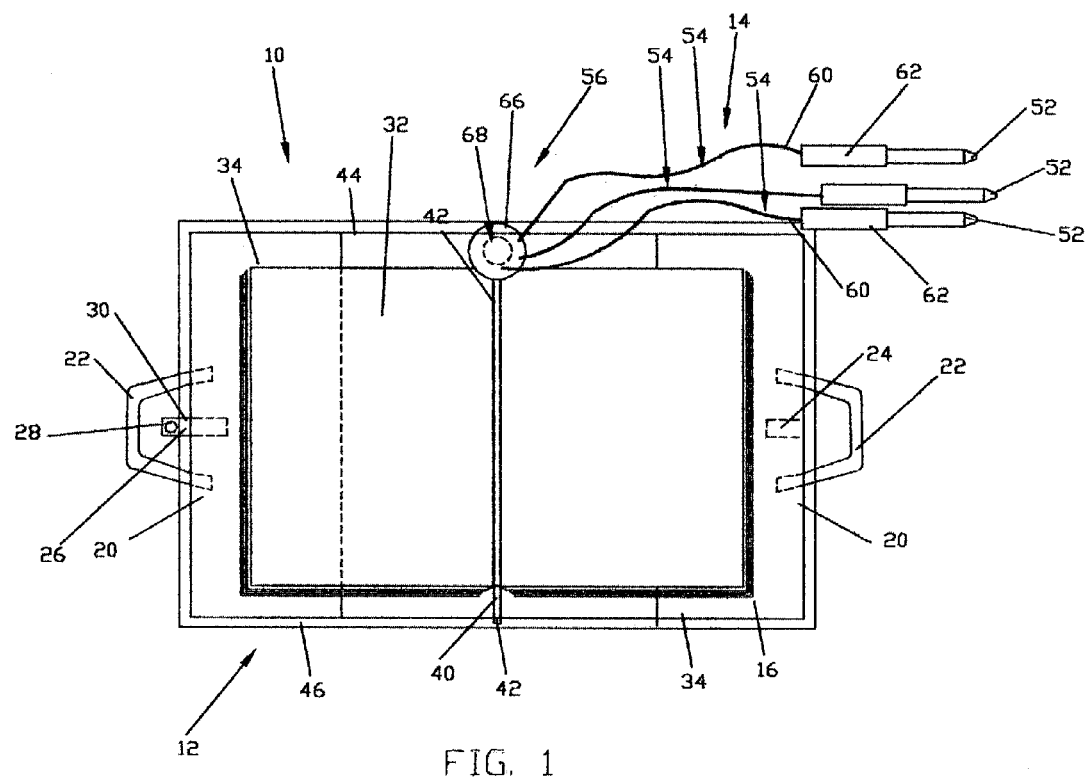
FIG. 1 is an inside view of the coloring kit of the present invention in combination with a coloring book and a plurality of crayons or coloring implements.
Figure 2:
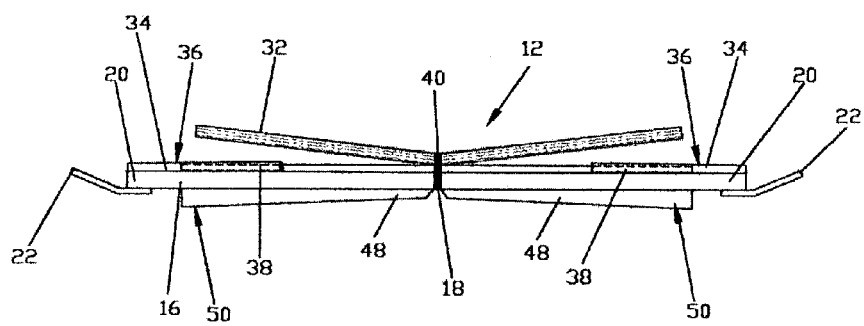
FIG. 2 is a top view of the carrying bag of the present invention in the open position.

As shown in FIG. 1 the present invention relates to a coloring kit generally indicated as 10 comprising a carrying bag and a coloring implement attachment assembly generally indicated as 12 and 14 respectively. As described more fully hereafter, the coloring implement attachment assembly 14 may be detachable fastened to the carrying bag 12 as shown in FIG. 1 or stored in the exterior pockets as shown in FIG. 3.

As shown in FIGS. 1 through 4, the carrying bag 12 comprises a panel 16 foldable along a center line portion 18 substantially equally distant from opposite end portions 20.

Figure 4:
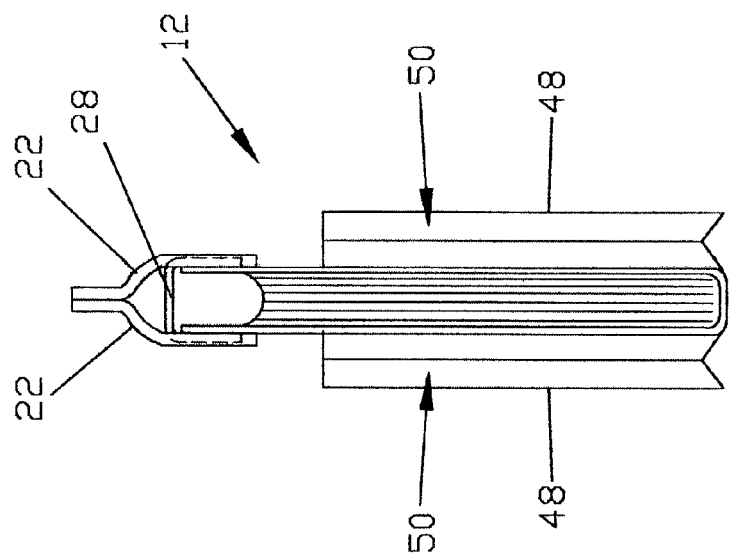
FIG. 4 is an end view of the carrying bag of the present invention in combination with a coloring book.
Figure 3:
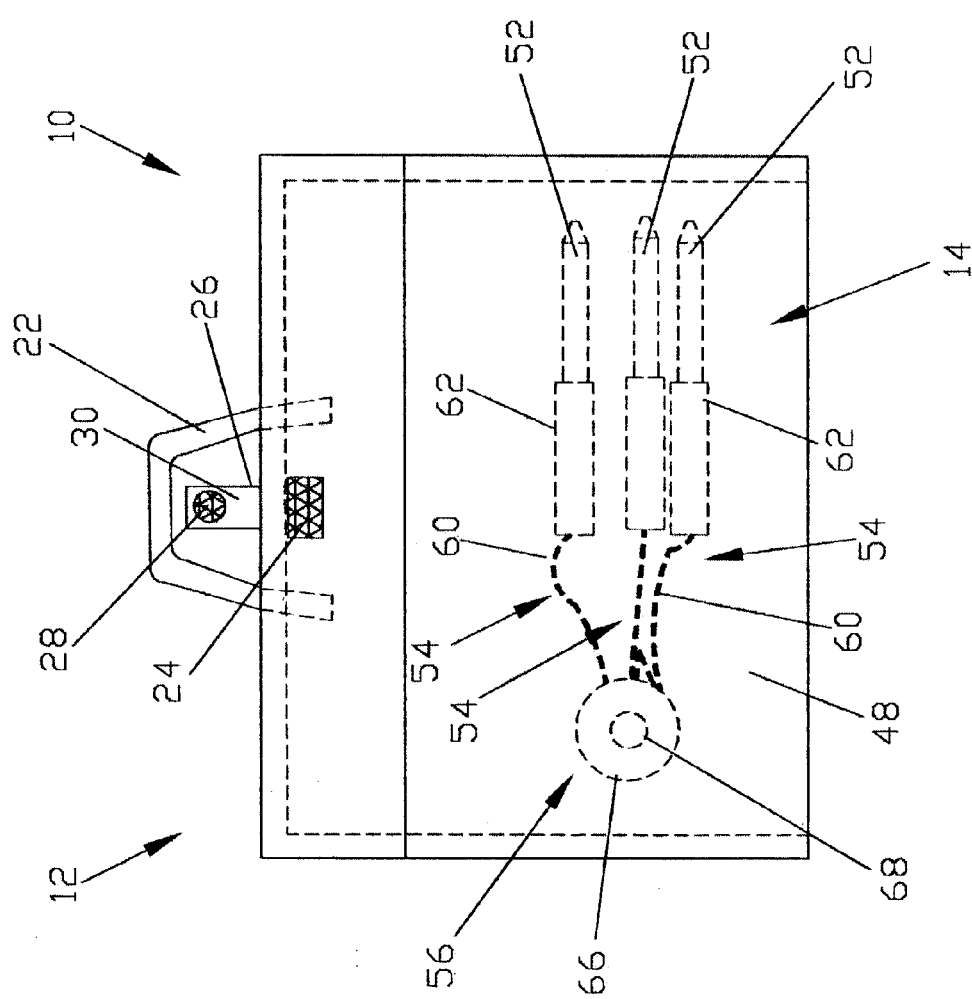
FIG. 3 is a side view of the carrying bag of the present invention in the closed position with the crayons or coloring implements and coloring implement attachment assembly stored in an exterior pocket.
Figure 5:
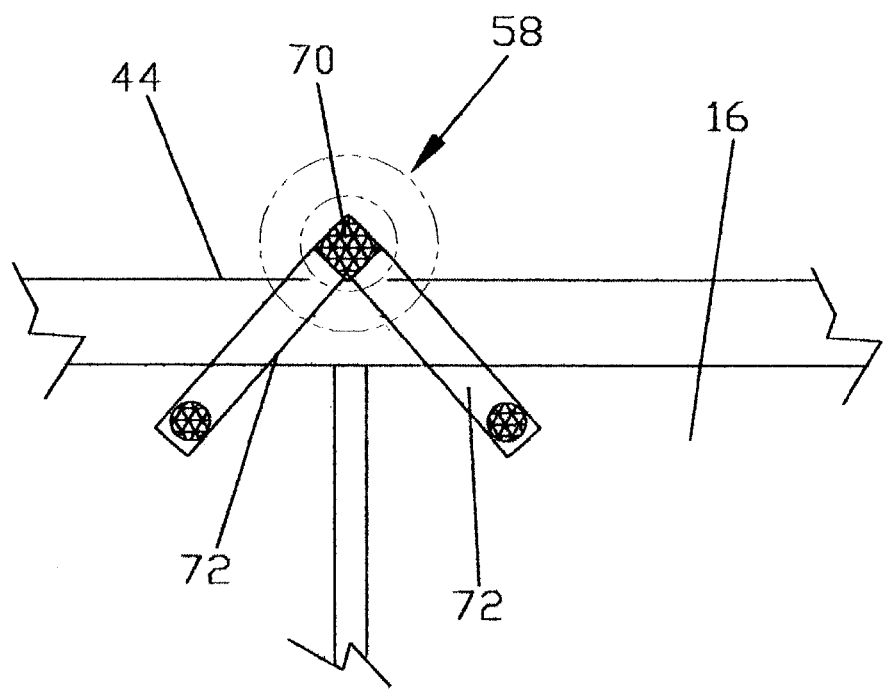
FIG. 5 is a detailed view of the second assembly attachment of the present invention.

A flexible carrying handle 22 is secured to each end portion 20 with which to carry the coloring kit 10 when in a folded or closed position as shown in FIGS. 3 and 4. A closure device comprising a first and second closure member is indicated as 24 and 26 respectively can selectively secure the carrying bag 12 in the closed or folded position. Specifically, the first closure member 24 may comprise a plurality of loops attached to the mid portion of one end portion 20 of the panel 16 and the second closure member 26 may comprise a plurality of hooks 28 attached to the mid portion of the opposite end portion 20 of the panel 16 by a flexible strap 30 such that the plurality of loops 24 and the plurality of hooks 28 may be engaged to hold the carrying bag 12 in the folded or closed position. Of course, a snap combination, button and loop combination or similar fastening devices may be used to selectively retain the carrying bag 12 in the folded or closed position when not in use.

The carrying bag 12 further includes a coloring book retainer to selectively retain a coloring book 32 within the interior thereof and at least one exterior coloring implement assembly storage compartment to store the coloring implement attachment assembly 14 when not in use. In particular, the coloring book retainer comprises an interior side panel 34 affixed to the interior on each side of the panel 16 to cooperatively form a corresponding interior side pocket or compartment 36 to receive a portion 38 of opposite sides of the coloring book 32 and an elastic strap or band 40 affixed at opposite end portions 42 thereof to the top portion 44 and bottom portion 46 of the panel 16 of the carrying bag 12 along the center line portion 18 of the panel 16. The coloring implement attachment assembly storage compartment comprises at least one exterior side panel 48 affixed to the exterior of the panel 16 adjacent the center line portion 18 to cooperatively form a exterior side pocket 50 to receive and store the coloring implement attachment assembly 14 and crayons or coloring implements each indicated as 52 when not in use.

Figure 7:
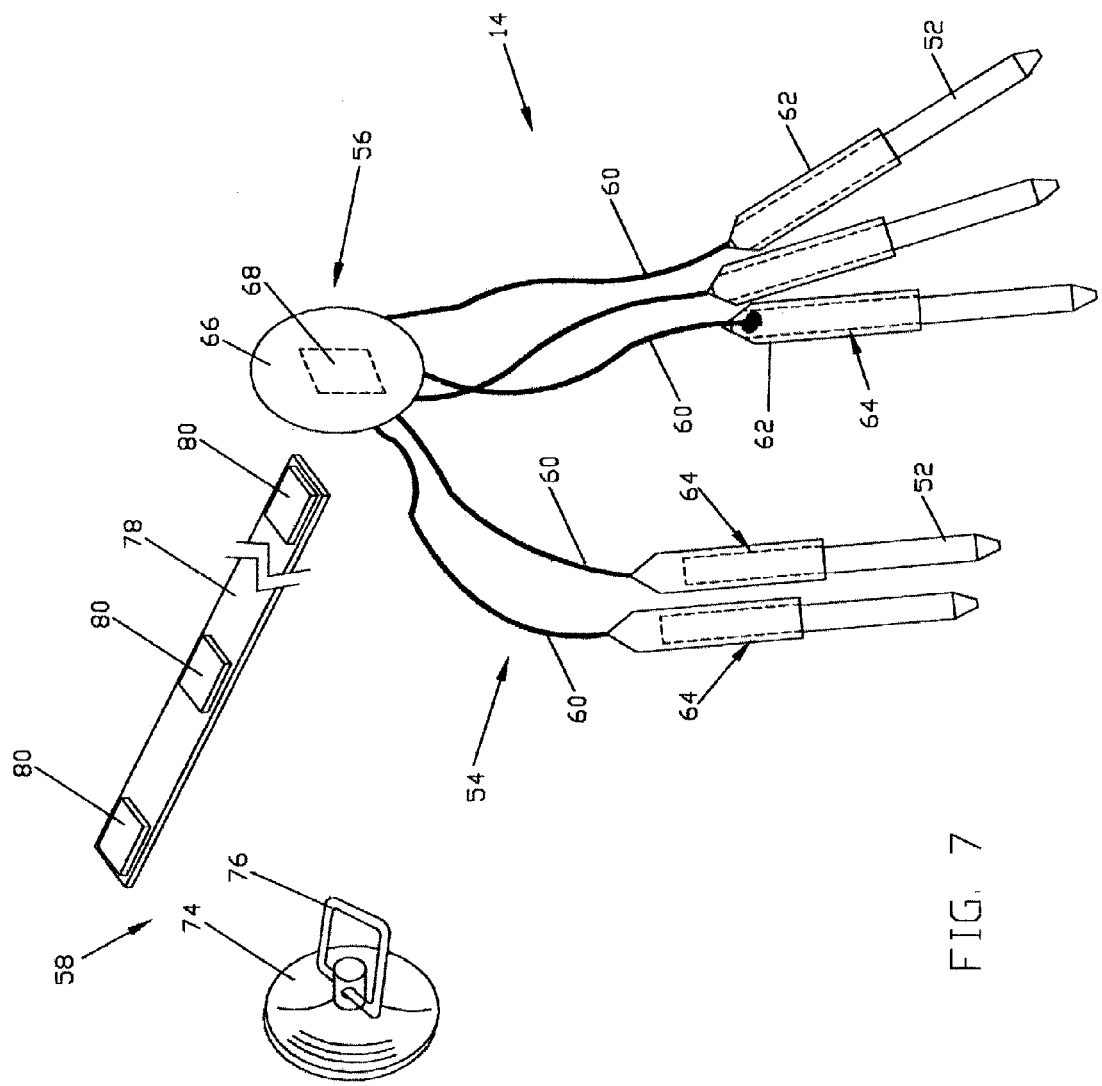
FIG. 7 is a detailed view of the coloring implement attachment assembly and another alternate embodiment of the second assembly attachment of the present invention.

As best shown in FIGS. 1 and 7, the coloring implement attachment assembly 14 comprises a plurality of attachment elements each generally indicated as 54 to couple a corresponding plurality of crayons or coloring implements 52 to the carrying bag 12 by an assembly attachment including a first and second assembly attachment element generally indicated as 56 and 58 respectively.

Each attachment element 54 comprises a flexible tether 60 having an implement attachment 62 connected or attached thereto including an implement receiving recess or channel 64 formed therein to removably receive a crayon or coloring implement 52 therein. The flexible tether 60 may be tied or bonded to the corresponding implement attachment 62. The implement receiving recesses or channels 64 may extend into or through the implement attachments 62 which are constructed of a resilient material such that the crayons or coloring implements 52 can be press fitted into the implement receiving recesses or channels 64.

The first assembly attachment 56 comprises an attachment member 66 affixed or connected to each flexible tether 60 and a snap or Velcro element 68 or similar fastening member; while, the second assembly attachment 58 comprises a pair of flexible straps or elements each indicated as 70 attached on opposite sides of the mid portion of the top portion 44 of the panel 16 and a snap or Velcro element 72 or similar fastening member to engage the snap or Velcro element 68 or similar fastening member of the first assembly attachment 56 to detachably couple the coloring implement attachment assembly 14 to the carrying bag 12.

Figure 6:
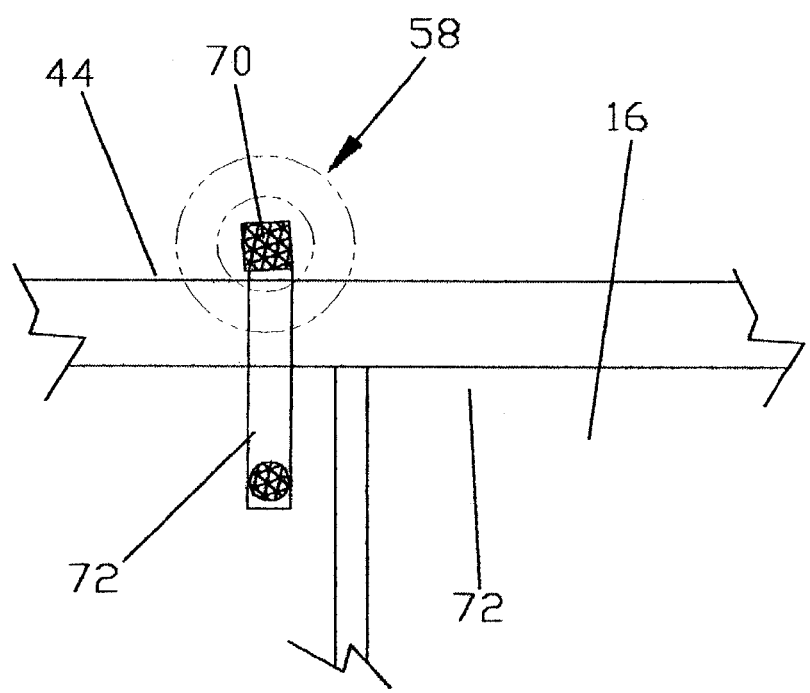
FIG. 6 is a detailed view of an alternate embodiment of the second assembly attachment of the present invention.

As shown in FIG. 6, the second assembly attachment 58 can comprise a snap or Velcro element 70 or similar fastening member attached to the panel 12 by a strap or element 72 attached adjacent the mid portion of the top portion 44 of the panel 16.

FIG. 7 shows an alternate embodiment of the second assembly attachment 58 comprising a suction cup attachment including a suction cup 74/attachment ring or attachment member 76 combination and a flexible strap or element 78 having a snap or Velcro element 80 or similar fastening member attached thereto to selectively engage the snap or Velcro element 68 of the first assembly attachment 56 to couple the coloring implement attachment assembly 14 to the second assembly attachment 58. The flexible strap or element 78 may be looped through the attachment ring or attachment member 76 and fastened by snaps or Velcro elements 82 or similar fastening members. Of course, the flexible strap or element 78 may be sewn or otherwise affixed thereto.

Before use, crayons or coloring implements 52 are inserted in the recesses or channels 64 and a coloring book 32 is held in place in the interior of the carrying bag 12 by the coloring book retainer.

When not in use, the coloring implement attachment assembly 14 and crayons or coloring implements 52 can be stored or placed in an exterior side pocket 50 and the carrying bag 12 secured in the closed or folded position by closure device.

To use, the coloring implement attachment assembly 14 and crayons or coloring implements 52 are removed from the exterior side pocket 50 and attached to the carrying bag 12 by securing the first and second assembly attachment elements 56 and 58 together. This allows the use of the crayons or coloring implements without rolling or falling away from the coloring book 32 and carrying bag 12.

The suction cup attachment may be used independently of the carrying bag 12 by attaching the coloring implement attachment assembly 14 thereto. The suction cup 74 is secured to a surface to place the crayons or coloring implements 52 within reach and prevent rolling away or falling to the floor out of reach.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention thath, as a matter of language, might be said to fall therebetween.

Now that the invention has been described,

What is claimed is:

1. A coloring kit for storing and carrying a coloring book and a plurality of crayons or coloring implements comprising a carrying bag and a coloring implement attachment assembly including a plurality of attachment elements detachably attached to said carrying bag to couple a corresponding plurality of crayons or coloring implements to the carrying bag, said coloring implement attachment assembly is coupled to said carrying bag by an assembly attachment including a first and second assembly attachment element, said first assembly attachment comprising an attachment member connected to a plurality of flexible tethers and a fastening member, and said second assembly attachment comprising a flexible element attached to said carrying bag and a fastening member to engage said fastening member of said first assembly attachment to detachably couple said coloring implement attachment assembly to said carrying bag.

2. The coloring kit of claim 1 wherein each said attachment element comprises a flexible tether having an implement attachment to support a crayon or coloring implement.

3. The coloring kit of claim 2 wherein each said implement attachment includes an implement receiving recess formed therein to removably receive a crayon or coloring implement therein.

4. The coloring kit of claim 3 wherein each said implement attachment is constructed of a resilient material such that the crayons or coloring implements can be press fitted into said implement receiving recess.

5. The coloring kit of claim 4 wherein said carrying bag comprises a foldable panel including a pair of sides having a top portion and a bottom portion extending therebetween.

6. The coloring kit of claim 5 wherein said carrying bag includes a flexible carrying handle is secured to each end portion of said foldable panel to carry the coloring kit when in a folded position.

7. The coloring kit of claim 5 wherein said carrying bag includes a closure device comprising a first and second closure member can selectively secure the carrying bag in the closed or folded position.

8. The coloring kit of claim 7 wherein said first closure member comprises a plurality of loops attached to the mid position of one end portion of said panel and said second closure member comprises a plurality of hooks attached to the mid portion of the opposite end portion of said panel by a flexible strap such that said plurality of loops and said plurality of hooks may be engaged to hold said carrying bag in the folded or closed position.

9. The coloring kit of claim 7 wherein said carrying bag further includes a coloring book retainer to selectively retain a coloring book within the interior thereof.

10. The coloring kit of claim 9 wherein said coloring book retainer comprises an interior side panel affixed to the interior on each side of said panel to cooperatively form a corresponding interior side pocket to receive a portion of opposite sides of the coloring book.

11. The coloring kit of claim 10 wherein said coloring book retainer further includes a band affixed at opposite end portions thereof to the top portion and bottom portion of said panel of said carrying bag.

12. The coloring kit of claim 10 wherein said coloring book retainer further includes an interior side panel affixed to the interior on each side of said panel to cooperatively form a corresponding interior side pocket to receive a portion of opposite sides of the coloring book.

13. The coloring kit of claim 9 wherein said coloring book retainer comprises a band affixed at opposite end portions thereof to the top portion and bottom portion of said panel of said carrying bag.

14. The coloring kit of claim 7 wherein said carrying bag includes at least one coloring implement assembly storage compartment to store said coloring implement attachment assembly when not in use.

15. The coloring kit of claim 14 wherein said coloring implement attachment assembly storage compartment comprises an exterior side panel affixed to the exterior of said panel adjacent the center line portion to cooperatively form an exterior side pocket to receive and store said coloring implement attachment assembly and crayons or coloring implements when not in use.

16. The coloring kit of claim 2 wherein each said implement attachment includes an implement receiving channel formed therethrough to removably receive a crayon or coloring implement.

17. The coloring kit of claim 16 wherein each said implement attachment constructed of a resilient material such that the crayons or coloring implements can be press fitted into said implement receiving channel.

18. The coloring kit of claim 1 wherein said first assembly attachment comprises an attachment member connected to each said flexible tether and a fastening member and said second assembly attachment comprises a pair of flexible elements attached to said carrying bag and a fastening member to engage said fastening member of said first assembly attachment to detachably couple said coloring implement attachment assembly to said carrying bag.

19. A coloring kit for storing and carrying a coloring book and a plurality of crayons or coloring implements comprising a carrying bag and a coloring implement attachment assembly including a plurality of attachment elements coupled to said carrying bag by an assembly attachment to couple a corresponding plurality of crayons or coloring implements to the carrying bag, each said attachment element comprising a flexible tether having an implement attachment to support a crayon or coloring implement and each said implement attachment including an implement receiving recess formed therein to removably receive a crayon or coloring implement therein.

20. The coloring kit of claim 19 wherein each said implement attachment is constructed of a resilient material such that the crayons or coloring implements can be press fitted into said implement receiving recess.

21. The coloring kit of claim 19 wherein said assembly attachment comprises a first assembly attachment element connected to each of said plurality of attachment elements.

22. The coloring kit of claim 21 wherein said assembly attachment further comprises a second assembly attachment element attached to said carrying bag and configured to engage said first assembly attachment element to detachably couple said coloring implement attachment assembly to said carrying bag.

* * * * *